United States Patent

[11] 3,611,864

[72] Inventor David L. Buckley
 Arcadia, Calif.
[21] Appl. No. 848,233
[22] Filed Aug. 7, 1969
[45] Patented Oct. 12, 1971
[73] Assignee Air Logistics Corporation
 Pasadena, Calif.

[54] SNAP-IN NUT PLATE
 7 Claims, 3 Drawing Figs.

[52] U.S. Cl. .................................................. 85/80,
 24/204, 52/618, 85/DIG. 2, 287/189.36 F
[51] Int. Cl. .................................................. A44b 17/00,
 F16b 13/04, F16b 37/04
[50] Field of Search .......................................... 85/80, DIG.
 2, 32, 32 V, 35, 17; 287/189.36 D, 189.36 F,
 189.35; 24/204, 213, 73 HS, 73 MF, 208.1, 208 A,
 208; 94/13; 244/114; 151/7, 69; 52/618, 622, 621

[56] References Cited
 UNITED STATES PATENTS
 1,179,597 4/1916 Zahner ........................... 151/69 UX
 2,736,248 2/1956 Gueulich ........................ 94/13
 3,083,429 4/1963 Barlow et al. .................. 24/208 A
 3,352,195 11/1967 Fisher ............................ 85/80
 3,476,165 11/1969 Vaughn ......................... 151/69
 3,499,673 3/1970 Soltysik et al. ............... 287/189.36 D X
 FOREIGN PATENTS
 1,111,742 11/1955 France .......................... 85/P
 914,063 12/1962 Great Britain ................ 151/69

Primary Examiner—Ramon S. Britts
Attorney—Christie, Parker & Hale

ABSTRACT: A replaceable multiple nut plate, for fastening corrugated or waffle-patterned sheets together, having a plurality of threaded openings for alignment with holes of the sheets and adapted for receiving threaded bolts from one side of the sheets. The nut plate has annular walls, protruding above the openings thereof, for snapping into the holes of the sheets and for allowing the bolts to be screwed into the nut plate without the need for restraining tools.

PATENTED OCT 12 1971
3,611,864
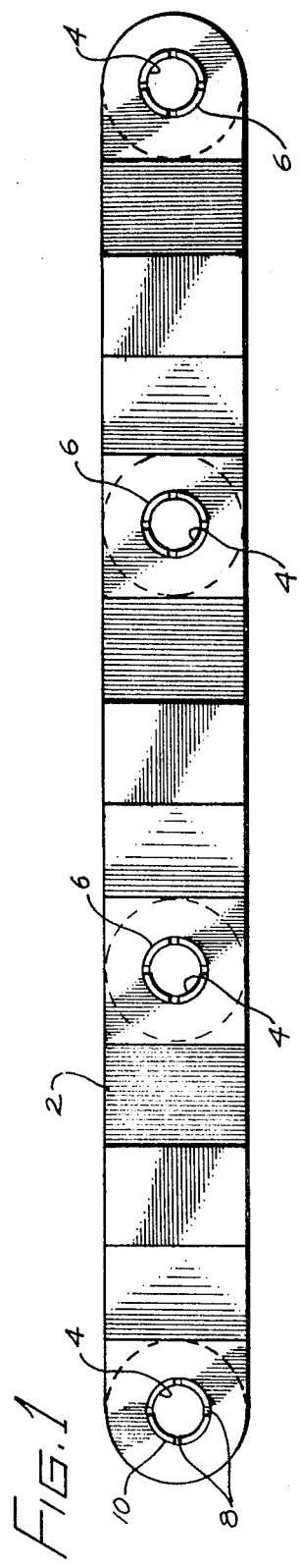
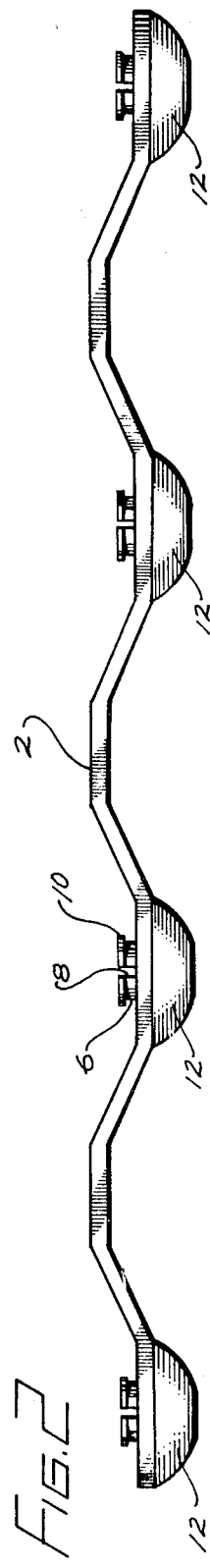
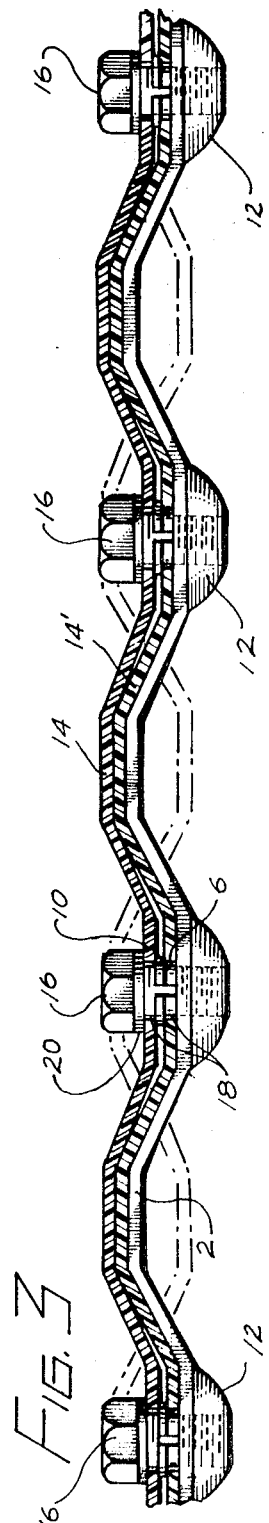
INVENTOR
DAVID L. BUCKLEY
BY
Christie, Parker & Hale
ATTORNEYS

SNAP-IN NUT PLATE

BACKGROUND OF THE INVENTION

This invention relates to a nut plate and more particularly concerns a replaceable fastening strip which can be snapped into position underneath the lowermost edge of two or more overlapping sheets.

A variety of structures are presently being constructed in accordance with fabrication techniques wherein a wall or sheet is fastened to an adjacent wall or sheet by means of bolts, screws, or similar fastening pins. It is often required that the building materials employed be suitable for installation by a single workman, usually because of the impossibility or inconvenience of working on both sides of a structure. Simplified construction materials of this type, which can be assembled with a minimum of manpower and supervision, are obviously of value in that they allow rapid and low-cost construction.

A particularly valuable construction technique pertains to the assembly of trackways, landing mats for aircraft, ground cover sheets and similar assemblies wherein a number of sheets are placed along the ground and fastened together at overlapping edges. Corrugated or waffle-patterned sheets having improved shock resistance and overall durability are increasingly being utilized as runways for aircraft in areas where a permanent landing surface cannot be readily or feasibly constructed. The sheets, which can be rolled into compact shapes for transportation and installation, ordinarily are placed along the ground in end-to-end fashion with the ends overlapping adjacent sheets. Usually constructed of reinforced plastic, they are provided with holes along their edges for receiving screws or bolts inserted from above the uppermost sheet. An assembly of sheets in this manner can be most rapidly completed in accordance with a fastening technique which does not require utilization of a separate female-threaded portion on the underside of the lowermost sheet, as this would require restraining of such threaded portion by special tools.

Present methods for fastening one sheet to another call for the molding or tapping of threaded holes in alternate edges of the sheets to be assembled. Alternately, threaded fittings are permanently fastened to the lowermost sheet. Fastening devices of these types, however, have been particularly disadvantageous in that they establish a top-bottom relationship that must be adhered to in order to assemble a series of sheets. Similarly, front-back and left-right relationships are also defined using such fastening devices, as when sheets are fastened to one another at their sides as well as at their forward and following ends. The sheets must therefore be assorted and assembled such that any one edge to be fastened corresponds to the appropriate edge of the sheet to which it is to be fastened, a procedure requiring considerable supervision and which often results in serious delay in assembly.

STATEMENT OF THE INVENTION

In accordance with this invention, two or more sheets can be fastened together using an elongate strip having a plurality of spaced-apart openings for alignment with holes of the sheets. Means are provided in the strip for receiving fastening pins. Additionally, the strip has means for engaging the sheet against which it is placed to prevent movement of the strip during insertion of the fastening pins.

Preferably, each of the holes of the strip is threaded and has a projecting annular wall which can be snapped into the holes of the sheets such that the strip can be secured to an outermost sheet prior to insertion of the fastening pins. Threaded fastening pins, for example, can then be inserted through the holes of the aligned sheets and screwed into threaded openings of the strips. The projecting annular walls prevent pivotal movement of the strip and avoid the need for any restraint on such member.

The annular walls of the threaded openings, which define snap-in projections, have an outer diameter slightly less than that of the holes of the sheets to be fastened. At least two of the openings of the fastening strip are provided with such an annular wall in order to resist pivotal movement of the plate during tightening of the fastening pins. The thickness of the annular walls, as well as their outer diameter, allows the strip to be easily snapped into position on a sheet by the simplest of manual operations. That is, a workman need only properly position the strip and exert pressure to cause the walls to snap into position within the holes of the sheets.

The fastening device of this invention is particularly useful for securing together corrugated or waffle-patterned sheets such as those employed in the assembly of trackways, landing mats for aircraft, and the like. The fastening strip can be constructed of reinforced plastic to conform to the shape of the patterned sheets such that it will take up a minimum of space both prior to and after assembly of the sheets. Each of the sheets is provided with identically sized and spaced fastener holes along each of their sides such that they can be assembled in any desired configuration. The sheets are ordinarily transported in a rolled-up position and unrolled at the assembly site. The fastening strips can be snapped into each of the sheets while they are being unrolled. Alternately, because of the minimum space required using such devices, the sheets can be rolled up with the strips in place, without damage to the sheets or the strips. Damaged strips can be easily replaced by prying out the snap-in projections and pressing in a replacement strip.

Although "gang" nut plates are presently utilized in a variety of construction applications, they have failed to provide both low cost and reliable means for fastening sheets together. For example, conventional gang channels and the like usually consist of a flat metal strip having a plurality of nut elements secured thereto. When one of the nut elements is damaged or defective it is required that the entire channel be replaced, a requirement that could well lead to expensive maintenance costs wherever a large number of such fastening devices are used. Snap-in, spring-tempered retainers for utilization with removable nut elements have been proposed as a means for allowing a single nut element to be replaced without having to discard the entire gang strip. This approach, however, represents an undesirable increase in complexity, yielding a fastening device both of high original cost and troublesome installation. In contrast, the fastener of this invention can be constructed of a low-cost plastic in the simplest possible configuration. It can be easily inserted in a minimum of time and can be discarded at minimal cost if damaged.

BRIEF DESCRIPTION OF THE DRAWINGS

FIG. 1 is a plan view of a fastener of this invention;

FIG. 2 is an elevational view of the fastener shown in FIG. 1; and

FIG. 3 is an elevational view of an assembly of sheets, shown in cross section, fastened together using the fastener shown in FIGS. 1 and 2.

DESCRIPTION OF THE PREFERRED EMBODIMENTS

FIG. 1 shows a fastening strip 2 having four threaded openings 4 for the reception of threaded bolts. Each opening has a projecting annular wall 6 which serves as a snap-in projection for the fastening strip. The outer diameter of each annular wall is slightly more than the diameter of the holes of the sheets to be fastened such that the strip is firmly secured when pressed into a sheet. Flexibility of each annular wall is increased by means of four slots 8 equally spaced around the openings.

FIG. 2 shows the undulating configuration of the fastening strip shows in FIG. 1, such design being adapted for utilization with a waffle-patterned sheet. The projecting annular walls 6 preferably have a height greater than the thickness of the sheet against which the fastening strip is to be positioned. Each of the annular walls is provided with an integrally formed lip or flange 10 for further assuring a secure fitting. The lip 10 of each wall 6 contacts the lowermost sheet to prevent the fastening strip from coming loose. A threaded nut element 12 integrally formed with the strip is disposed beneath each opening.

FIG. 3 illustrates the use of the fastening strip of FIGS. 1 and 2 for securing two waffle-patterned sheets 14 and 14' as reinforced plastic sheets commonly employed in the construction of landing mats for aircraft. The fastening strip 2 is of an undulating configuration such that it precisely conforms to the pattern of the sheet. Each of the four annular walls 6 is snapped into the lowermost sheet by the application of pressure on the fastening strip. No further concern need be given to the fastening strip after it has been so positioned, since the snap-in projections will hold it securely within the lowermost sheet throughout the remaining fastening operations, which are conducted from above the assembly. Hexagonal-head bolts 16 are inserted into the aligned holes 18 of the sheets and into the threaded nut element 12 of the fastening strip. A washer 20 is usually employed with each bolt to insure a tight fitting. The bolts are then screwed into the nut elements to a position as shown wherein the head of the bolt is approximately flush with the surface of the uppermost sheet.

The fastener of this invention is particularly useful for securing together corrugated or waffle-patterned sheets constructed of fiberglass or similar reinforced plastic. The strip is preferably constructed of polycarbonate although any comparable plastic can be employed. Material which is susceptible to corrosion, however, ordinarily must be coated with a protective material.

When employed in an assembly of patterned or corrugated sheets used as landing mats for aircraft, the fastening strips must normally withstand torques of approximately 90 inch-pounds and impacts such as those created during the unrolling of a 48-foot roll of the sheets. That is, the strips when attached to the sheets prior to assembly must be sufficiently durable such that they will not be damaged or loosened when the sheets are unrolled and hit the ground. Additionally, each fastening strip and bolt combination must normally withstand a shear load of about 3,300 pounds. When assembled, the strips may often be placed on mud, sand and the like. Heavy and light vehicles may be driven across the mat, which can be used as a landing mat, a roadway and the like. The strips must thus be sufficiently durable such that they will not twist, jam or tear loose.

The fastening strips of this invention are easily replaceable since they require no bonding or riveting and are constructed of low-cost plastic. They can be installed in a minimum time and require no special tools. A workman can install the strips with gloved hand.

A fastening grip utilized in a landing mat or roadway mat is most advantageously utilized in combination with ½-inch sized bolts, which provide a satisfactory bearing surface. Smaller bolts can be employed as long as a bearing surface of approximately one-half inch diameter is provided.

Although the fastener of this invention has been described in terms of a fastening strip having threaded nut elements for use with threaded bolts, it should be noted that alternate fastening pins and strips can be utilized. For example, the strip can be formed with nut elements adapted for the locking of an appropriate lock-type fastening pin rather than for the screwing of a threaded bolt. In any case, the fastener is securely held against the lowermost sheet during insertion of the fastening pins.

It is claimed:

1. Apparatus for fastening together a pair of sheets in closely adjacent relationship, each sheet being of identical waffle-patterned configuration and having a plurality of holes defined therethrough, each hole being aligned with a corresponding hole in the adjacent sheet, the apparatus comprising:
   a. an elongate strip of waffle-patterned configuration conforming to that of the sheets, the strip having a plurality of spaced-apart openings, each opening adapted for alignment with a distinct pair of aligned holes in the sheets when the strip is placed against one of the sheets;
   b. a plurality of fastening pins each adapted for insertion through a distinct pair of aligned holes in the sheets and into an aligned opening in the elongate strip;
   c. means defined on each fastening pin and within the aligned opening in the elongate strip for securing each pin within the elongate opening; and
   d. retaining means projecting from the strip for engaging the sheet against which it is placed to prevent movement of the strip relative to the engaged sheet when the fastening pins are inserted.

2. The apparatus of claim 1, wherein the retaining means comprises annular walls projecting from the surfaces defining at least two of elongate strip openings, the walls being engageable with the surfaces defining holes in at least one sheet.

3. The apparatus of claim 1, wherein the elongate strip openings are threaded and wherein the fastening pins are threaded bolts.

4. The apparatus of claim 1, wherein the pair of sheets are fastened together in substantially abutting relationship and wherein the strip is placed in face-to-face contact with one of the sheets.

5. The apparatus of claim 2 wherein the annular walls are slotted.

6. The apparatus of claim 2 wherein the annular walls have a height greater than the depth of the surfaces defining the sheet holes, the apparatus further comprising annular flanges extending outwardly from the upper ends of the annular walls.

7. Fastener in accordance with claim 1 wherein the strip is formed of polycarbonate.